(12) United States Patent
Cannon et al.

(10) Patent No.: US 7,058,358 B2
(45) Date of Patent: Jun. 6, 2006

(54) ENHANCED WIRELESS NETWORK SECURITY USING GPS

(75) Inventors: Joseph M. Cannon, Harleysville, PA (US); James A. Johanson, Macungie, PA (US); Philip D. Mooney, Sellersville, PA (US)

(73) Assignee: Agere Systems Inc., Allentown, PA (US)

( * ) Notice: Subject to any disclaimer, the term of this patent is extended or adjusted under 35 U.S.C. 154(b) by 628 days.

(21) Appl. No.: 09/759,527

(22) Filed: Jan. 16, 2001

(65) Prior Publication Data

US 2002/0094777 A1    Jul. 18, 2002

(51) Int. Cl.
*H04B 7/00*    (2006.01)

(52) U.S. Cl. .................. 455/41.2; 455/410; 455/414.2; 455/456.3; 455/456.4

(58) Field of Classification Search .. 455/456.1–456.6, 455/41.1–41.3, 410, 411, 452.1, 461, 466, 455/414.1–414.3
See application file for complete search history.

(56) References Cited

U.S. PATENT DOCUMENTS

| | | | | |
|---|---|---|---|---|
| 5,463,261 | A * | 10/1995 | Skarda et al. | 307/131 |
| 5,922,073 | A * | 7/1999 | Shimada | 713/200 |
| 6,389,288 | B1 * | 5/2002 | Kuwahara et al. | 455/456.6 |
| 6,466,938 | B1 * | 10/2002 | Goldberg | 707/100 |
| 6,526,335 | B1 * | 2/2003 | Treyz et al. | 701/1 |
| 6,560,443 | B1 * | 5/2003 | Vaisanen et al. | 455/73 |
| 6,580,372 | B1 * | 6/2003 | Harris | 340/686.6 |
| 6,614,768 | B1 * | 9/2003 | Mahany et al. | 370/328 |
| 6,640,098 | B1 * | 10/2003 | Roundtree | 455/414.2 |
| 6,640,106 | B1 * | 10/2003 | Gutowski et al. | 455/456.1 |
| 2002/0002036 | A1 * | 1/2002 | Uehara et al. | 455/41.2 |
| 2002/0028683 | A1 * | 3/2002 | Banatre et al. | 455/456.3 |
| 2002/0077060 | A1 * | 6/2002 | Lehikoinen et al. | 455/41.2 |
| 2002/0102996 | A1 * | 8/2002 | Jenkins | 455/456.3 |
| 2002/0119788 | A1 * | 8/2002 | Parupudi et al. | 455/456.1 |

* cited by examiner

Primary Examiner—Charles Craver

(57) ABSTRACT

A wireless piconet network device includes a GPS receiver to determine and provide earth coordinates to a gatekeeper of a wireless network so as to provide a level of security to wireless networks which requires accessing wireless devices to be within predefined boundary coordinates. The automatic restriction of access to a wireless network (e.g., a wireless local area network (LAN) such as a piconet network) by requiring a wireless network device to provide earth coordinates (e.g., GPS location information) as part of an establishment or maintenance of a connection to a wireless network, independent of a range of communication of any device in the wireless network. A wireless piconet network device outside of predetermined earth coordinates of a secured area (e.g., a building, a room in a building, a desk in a room in a building, etc.) may be denied access to resources on the wireless network, and/or required to provide additional authorization information so as to confirm authorized secured status of the entering wireless device.

11 Claims, 6 Drawing Sheets

ENHANCED WIRELESS NETWORK SECURITY USING GPS

BACKGROUND OF THE INVENTION

1. Field of the Invention

This invention relates generally to wireless networks. More particularly, it relates to improved security apparatus and techniques for wireless networks, particularly piconet type networks such as a BLUETOOTH™ conforming piconet network.

2. Background

Conventional secured networks have been wired networks physically connecting a plurality of network devices. Such networks are conventionally secured with authorization of one or more passwords input by a user of a particular network device.

A wired network connection affords a reasonable level of security in that the user must be inside a building to connect to the network. However, when expanding a network to include wireless connectivity, wireless connections to the network do not inherently have the same physical restrictions to access that wired connections do.

Piconet networks, or small, short range wireless networks, are being formed by more and more devices in many homes and offices. In particular, a popular piconet standard is commonly referred to as a BLUETOOTH™ piconet. Piconet technology in general, and BLUETOOTH technology in particular, provides peer-to-peer communications over short distances.

The wireless frequency of piconets may be 2.4 GHz as per BLUETOOTH standards, and/or typically have a 30 to 300 foot range. The piconet RF transmitter may operate in common frequencies which do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems.

A plurality of piconet networks may be interconnected through a scatternet connection, in accordance with BLUETOOTH protocols. BLUETOOTH network technology may be utilized to implement a piconet wireless network connection (including scatternet). The BLUETOOTH standard for piconet wireless networks is well known, and is available from many sources, e.g., from the web site www.bluetooth.com.

Short range wireless connections such as those offered by piconets in general, and BLUETOOTH conforming piconets in particular, while having many advantages provided by wireless connectivity, also inherently have distinct disadvantages from wired connections. For instance, a person just outside the building, but still in range of the short range wireless network (e.g., 802.11, BLUETOOTH etc.) could gain access to an internal wireless server from outside the building but still within the range of the short range wireless network.

FIG. 6 depicts an exemplary secured building 510 including a network of exemplary wireless devices 500, 502, with connectivity access inadvertently provided to an unauthorized wireless device 504.

In particular, as shown in FIG. 6, an exemplary short range wireless network is established within the confines a building 510. In the given example, wireless connectivity is established between an entering wireless device, e.g., BLUETOOTH piconet device 502, or 802.11b compliant device, whereupon a password entered by a user of the entering wireless device 502 is authorized by a piconet security server 500. However, in the given example, an unauthorized wireless device 504 lurks outside the secured building, but within the short range of at least one wireless network device within the building, unbeknownst to the wireless network administrator. Unfortunately, while the unauthorized wireless device 504 may still be required to input a properly authorized password to allow access to resources on the wireless network, a first layer of security has already been breached by allowing the unauthorized wireless device 504 the ability to receive wireless transmissions in the short range wireless network.

In such a scenario, since connectivity access to the secured network may be obtained from a location outside of the secured building, the network security relies entirely on the password strategies for the particular network. However, this may be problematic in certain higher security applications because access may be gained external to the secured building using, e.g., stolen access codes.

Previous attempts to provide security to wired network devices included dial up access techniques using one or more passwords or even constantly changing passwords to prevent unauthorized access. However, dial up access techniques do not address specific challenges of wireless access to secure servers. Moreover, dial up security solutions in a wireless world would require all users inside the secured building to go through excessive security steps which simply add layers of password type strategies.

There is a need for an apparatus and technique which allows wireless devices, and in particular wireless BLUETOOTH piconet devices, to be implemented in secure environments allowing secure communications which prevent unauthorized communications within range of the piconet devices.

SUMMARY OF THE INVENTION

In accordance with the principles of the present invention, a wireless piconet device comprises a wireless piconet front end, and a GPS receiver in communication with the wireless piconet front end.

In accordance with another aspect of the present invention, a wireless piconet server comprises a wireless piconet front end. An earth coordinates authorization module determines authority of a received set of coordinates to gain access to a wireless network. Boundary coordinates correspond to a predetermined secured area for access to the wireless network.

A method of authorizing a wireless piconet network device to gain access to a wireless network in accordance with yet another aspect of the present invention comprises receiving a set of earth coordinates from the wireless piconet network device. The received set of earth coordinates are compared to predetermined boundaries of a secured area. If the received set of earth coordinates are within the predetermined boundaries of the secured area, the wireless piconet network device is authorized to gain access to the wireless network.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to the automatic restriction of access to a wireless network (e.g., a wireless local area network (LAN) such as a piconet network) by requiring a wireless network device to provide earth coordinates (e.g., GPS location information) as part of an establishment or maintenance of a connection to a wireless network, independent of a range of communication of any device in the wireless network. Thus, in accordance with the principles of the present invention, a wireless piconet network device outside of predetermined earth coordinates of a secured area (e.g., a building, a room in a building, a desk in a room in a building, etc.) may be denied access to resources on the wireless network, and/or required to provide additional authorization information so as to confirm authorized secured status of the entering wireless device.

Figure 1:
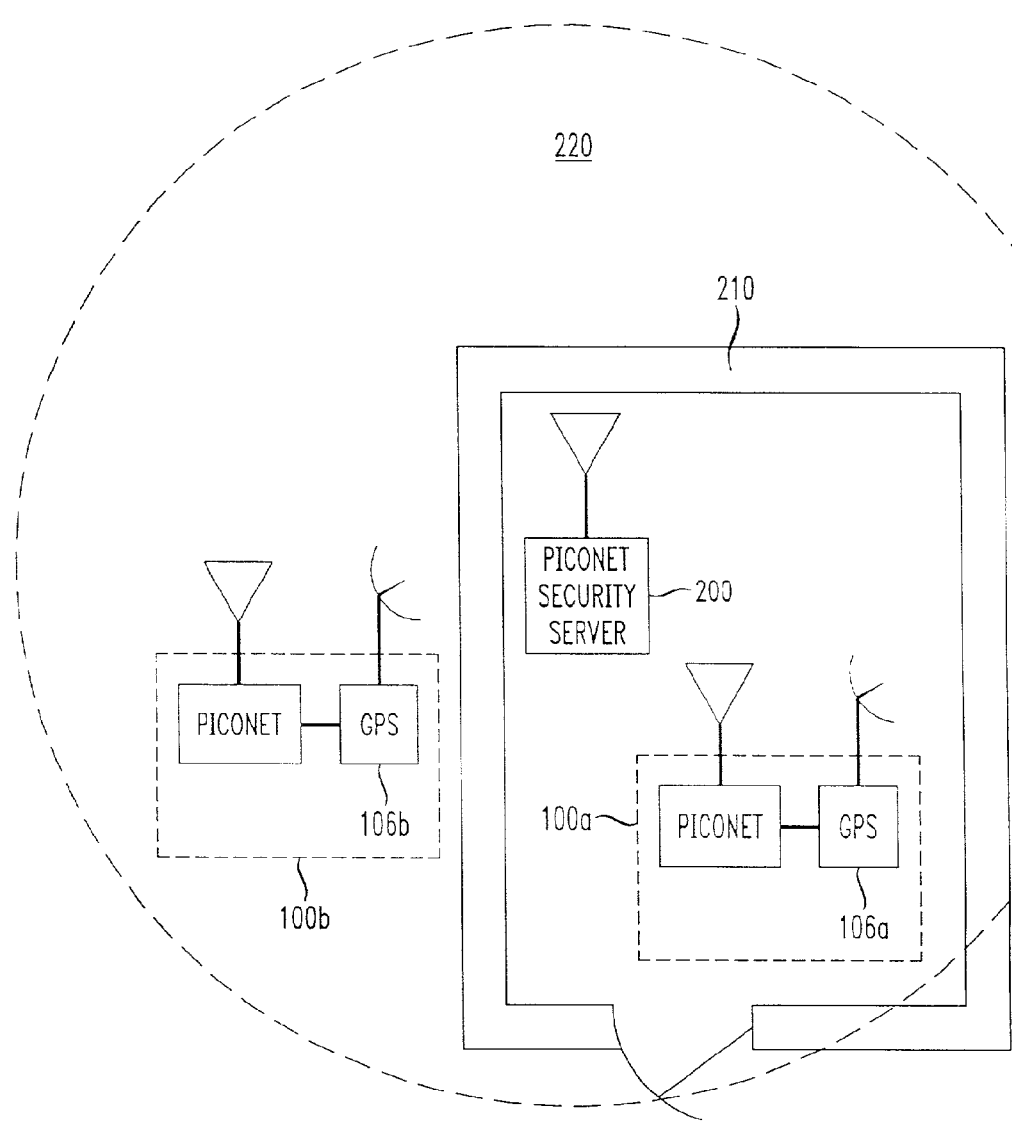
FIG. 1 depicts two piconet wireless network devices, one within a secured building permitted to have authorized access to the wireless network in the secured building, and another external to a secured building and not permitted to have authorized access to the wireless network in the secured building, in accordance with the principles of the present invention.

FIG. 1 depicts two piconet wireless network devices, one within a secured building permitted to have authorized access to the wireless network in the secured building, and another external to a secured building and not permitted to have authorized access to the wireless network in the secured building, in accordance with the principles of the present invention.

In particular, FIG. 1 shows the perimeter of a secured building 210, including a short range wireless (e.g., BLUETOOTH piconet) security server 200, and an authorized wireless piconet network device 100a. In accordance with the principles of the present invention, the authorized wireless piconet network device 100a includes a Global Positioning Satellite (GPS) receiver 106a suitable for receiving information as a basis for determining earth coordinates of the relevant wireless piconet network device 100a.

The global positioning system (GPS) is a worldwide radio-navigation system formed from a constellation of 24 satellites and their ground stations. GPS uses these "man-made stars" as reference point to calculate positions accurate to a matter of meters. In fact, with advanced forms of GPS location measurements are achievable to better than one centimeter. In recent years, GPS receivers have been miniaturized to just a few integrated circuits and thus are becoming very economical. The GPS receivers 106a, 106b shown in FIG. 1 are conventional.

The GPS receiver 106a may be a separate module in communication with the piconet front end of the relevant wireless piconet network device 100a, or may be integrated within the wireless piconet network device 100a to reduce the chance of faking the coordinates.

In accordance with the principles of the present invention, the earth coordinates determined based on the GPS receiver 106a are forwarded to the piconet security server 200 or other network device to determine whether or not the earth coordinates forwarded by the wireless piconet network device 100a correspond to a secured area, e.g., to an area internal to the boundary defined by the four walls of the perimeter 210. Of course secured areas may include any shaped area, in both two- and three dimensions.

Also shown in FIG. 1 is an unauthorized wireless piconet network device 100a potentially attempting to communicate with devices in the wireless piconet network within the secured area defined internal to the perimeter 210. However, in accordance with the principles of the present invention, the unauthorized wireless piconet network device 100b will determine either GPS coordinates which will not be within the secured areas coordinates stored in the piconet security server 200, or will be a network device which does not include a GPS receiver at all. In either case, authorization will be denied by devices within the wireless piconet network, and thus an additional level of security relating to physical location of the communicating wireless device will not have been breached, providing increased security protection.

The wireless piconet network device 100 may be virtually any device including a short range wireless front end (e.g., a BLUETOOTH piconet front end). For instance, the wireless piconet network device 100 may be, e.g., a computer, personal digital assistant (PDA), printer, scanner, cell phone, etc.

In accordance with the principles of the present invention, while a wireless piconet network device 100 attempts to gain access to a wireless network service (e.g., a BLUETOOTH compatible piconet printer, LAN access), the BLUETOOTH application in the wireless piconet network device 100 determines and then passes its earth coordinates (e.g., GPS location), typically accurate to a few meters (or even centimeters using Differential GPS), along with any other required authentication information to the wireless network, e.g., to the piconet security server 200. A suitable application in the relevant gatekeeper of the wireless network will determine whether or not the received GPS location is within a predefined secured, authorized access area. If the received GPS location is within the authorized access area, access is granted. If outside the authorized access area, access may be denied. Alternatively, if outside the authorized access area, further authentication information may be requested of the entering wireless piconet network device 100. Once authorized, a device may be permitted to wander outside the secured area, or not.

The authorized area may be defined in any suitable manner. For instance, it may be defined as internal to a particular perimeter 210 as shown in FIG. 1, or it may simply be a specified distance from a particular point (e.g., within a circle) less than a given range of the wireless network.

Figure 2:
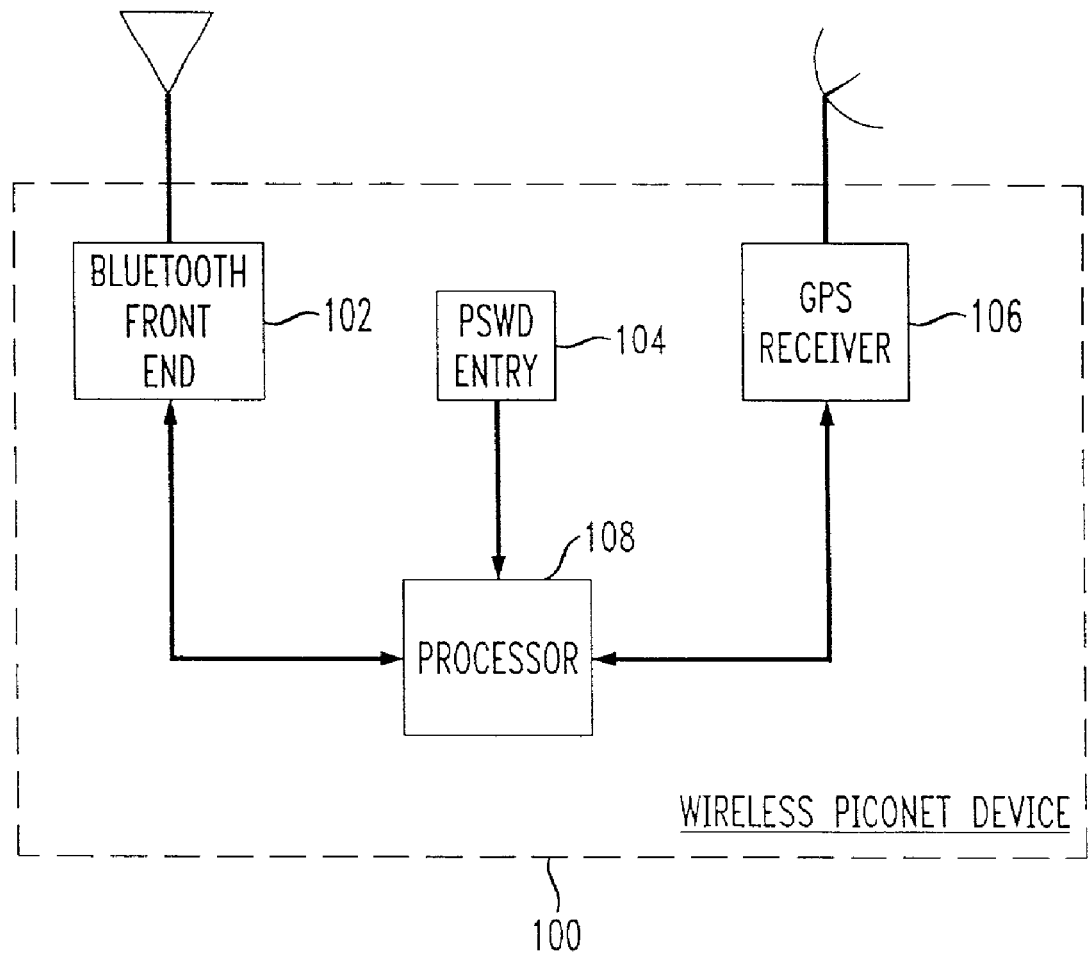
FIG. 2 shows an exemplary piconet wireless network device including a BLUETOOTH piconet front end and Global Positioning System (GPS) receiver for providing location information for security authorization purposes, in accordance with the principles of the present invention.

FIG. 2 shows an exemplary piconet wireless network device including a BLUETOOTH piconet front end and Global Positioning System (GPS) receiver for providing location information for security authorization purposes, in accordance with the principles of the present invention.

In particular, FIG. 2 shows a more detailed embodiment of a wireless piconet network device 100, including a BLUETOOTH piconet front end 102, a GPS receiver 106, and a suitable processor communicating with both the BLUETOOTH piconet front end 102 and the GPS receiver 106. The processor 108 may be, e.g., a microprocessor, a microcontroller, ASIC, or a digital signal processor (DSP). Also, the processor 108 may be integrated within the GPS receiver 106 and/or the BLUETOOTH front end 102 such that as few as one processor may be required within the wireless piconet network device 100.

Also shown in FIG. 2 is a password entry device 104, e.g., a keyboard, allowing the user to input a password for forwarding to the piconet security server 200 and authorization of wireless network access.

Figure 3:
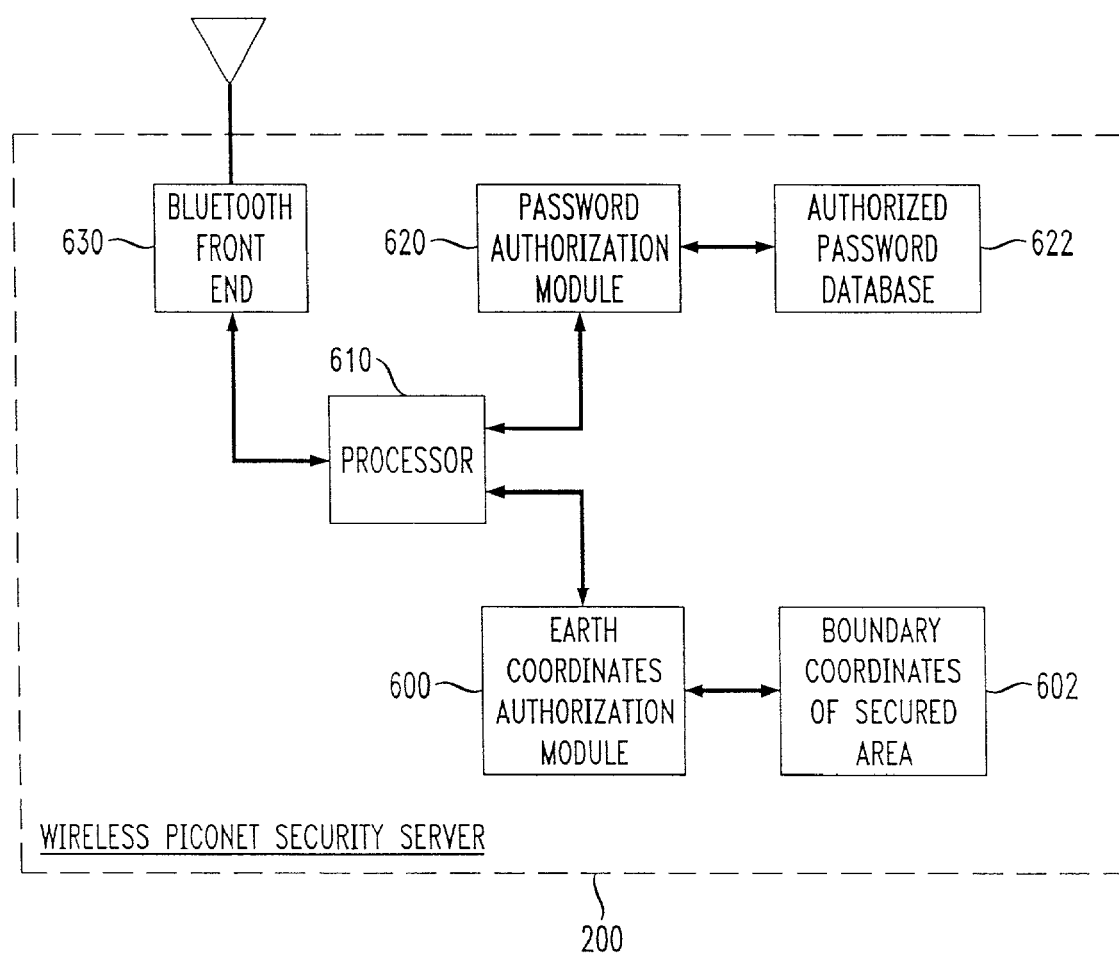
FIG. 3 shows an exemplary wireless piconet security server capable of authorizing earth coordinates of another wireless network device and/or a password, in accordance with the principles of the present invention.

FIG. 3 shows an exemplary wireless piconet security server capable of authorizing earth coordinates of another wireless network device and/or a password, in accordance with the principles of the present invention.

In particular, as shown in FIG. 3, the exemplary wireless piconet security server 200 includes a BLUETOOTH front end 630, a suitable processor 610 (e.g., a microprocessor, a microcontroller, or a DSP), and an earth coordinates authorization module 600. The wireless piconet security server 200 may further include a password authorization module 620.

The earth coordinates authorization module 600 may be, e.g., an application program operating on the processor 610. The earth coordinates authorization module 600 accesses predetermined boundary earth coordinates 602 defining the secured area (or areas). Received GPS location coordinates received from wireless piconet network devices requesting authorization are compared to the boundary coordinates 602 by the earth coordinates authorization module 600 to determine whether or not the requesting wireless piconet network device is within the predetermined secured area. If so, then authorization is allowed to proceed. If not, the requesting wireless piconet network device is denied access to resources on the wireless network. Depending upon the particular application, a denied request might indicate that the reason for denial is outside of the secured area.

The wireless piconet security server 200 may also include the password authorization module 620 and associated database storage of pre-authorized passwords 622. The password authorization module 620 compares passwords received from requesting wireless piconet network devices to determine whether or not the password is authorized.

The wireless piconet security server 200 may determine authorization using earth coordinates before using a password received from the requesting wireless piconet network device, or after using the password, within the scope of the present invention.

Figure 4:
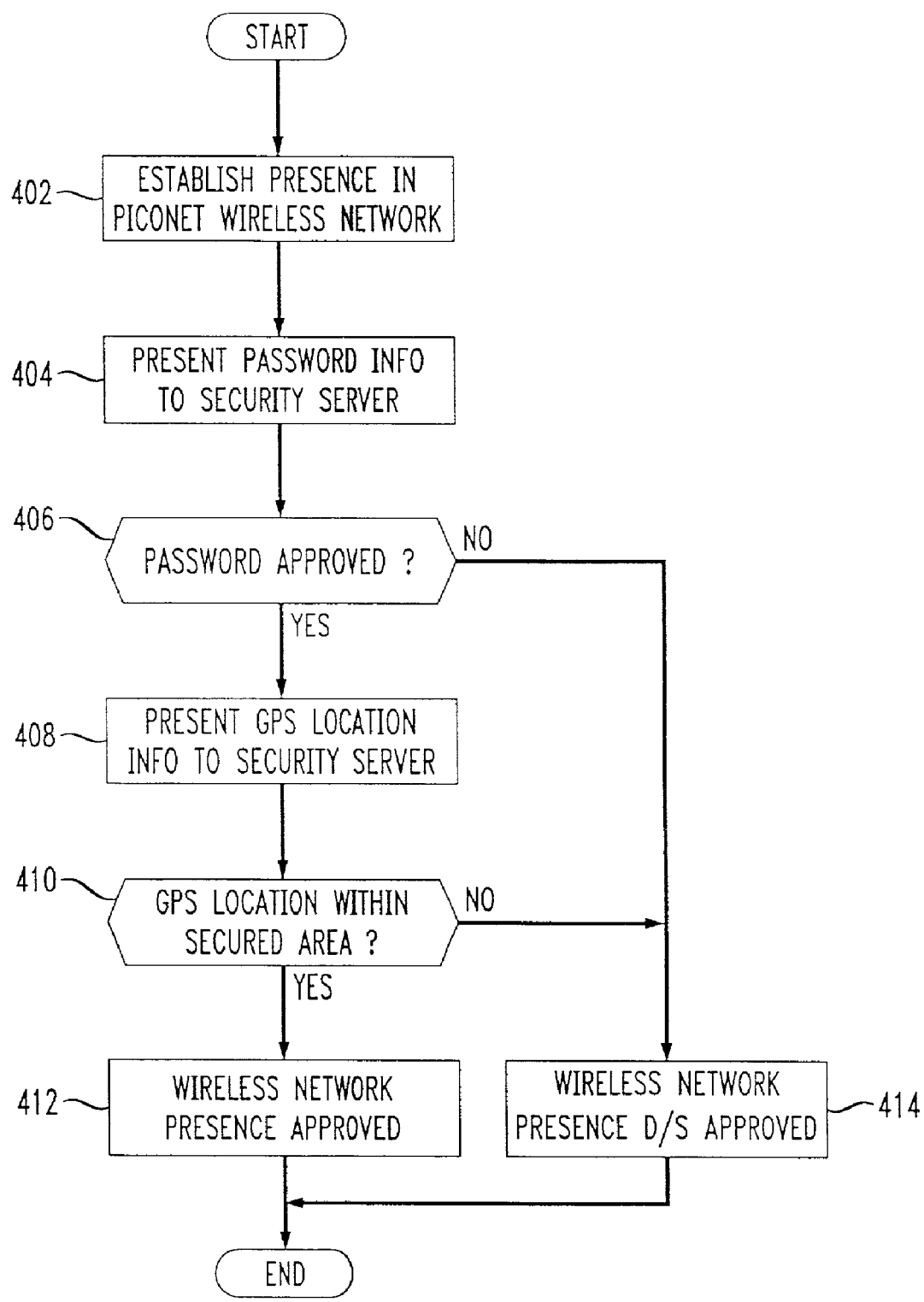
FIG. 4 shows an exemplary process flow of authorization of a piconet wireless network device within defined absolute earth coordinates, in accordance with the principles of the present invention.

FIG. 4 shows an exemplary process flow of authorization of a piconet wireless network device within defined absolute earth coordinates, in accordance with the principles of the present invention.

In particular, step 402 of FIG. 4 shows the new presence of a wireless piconet network device in a piconet wireless network.

Step 404 shows the presentation of a password from the wireless piconet network device 100 to the wireless piconet security server 200. Of course, the GPS location may be checked first, and then the password verified, within the scope of the present invention.

In step 406, the wireless piconet security server 200 determines whether or not the supplied password is among those stored in the authorized password database 622. If not, the wireless piconet network device is disapproved, as shown in step 414, and the process ends. The network may or may not ignore further communications from the disapproved wireless piconet network device, depending upon the particular application.

However, if the password is approved in step 406, the process may proceed to check the supplied GPS earth coordinates against secured areas defined by boundary coordinates 602.

In particular, as shown in step 408, the GPS location information determined by the requesting wireless piconet network device is presented to the wireless piconet security server 200.

In step 410, the earth coordinates authorization module 600 determines whether or not the earth coordinates supplied by the requesting wireless piconet network device are within the predetermined secured area(s). If not, the process disapproves the requesting wireless piconet network device 100 as shown in step 414, and the process ends.

However, if the received earth coordinates are within an area defined by the boundary coordinates 602, then the requesting wireless piconet network device 100 is granted access to the wireless network.

In a preferred embodiment, the earth coordinates are periodically, and/or upon demand of the wireless piconet security server in a polling scenario, provided to the wireless piconet security server to determine whether or not the relevant wireless piconet network device remains within the secured area defined by the boundary coordinates 602.

If not, access is preferably terminated, at least until the wireless piconet network device re-authorizes its presence in and access to the wireless network.

The password provided by the wireless piconet network device may be input by the user, or may be pre-set in the wireless piconet network device.

The boundary coordinates 602 may be established using a configuration routine which receives GPS coordinates relating to extreme boundaries of the secured area as a person walks a suitable wireless piconet network device along the perimeter of the secured area.

In an alternative embodiment, a wireless piconet network device may determine whether or not there are multiple short range wireless services detected within range. For instance, when a wireless piconet network device discovers that there are multiple similar services within range, it may access the wireless network which has a communicating device which is physically closest. Alternatively, using prior knowledge of walls or other obstacles, it may automatically access the wireless service provider whose RF signal is the least obstructed.

Figure 5:
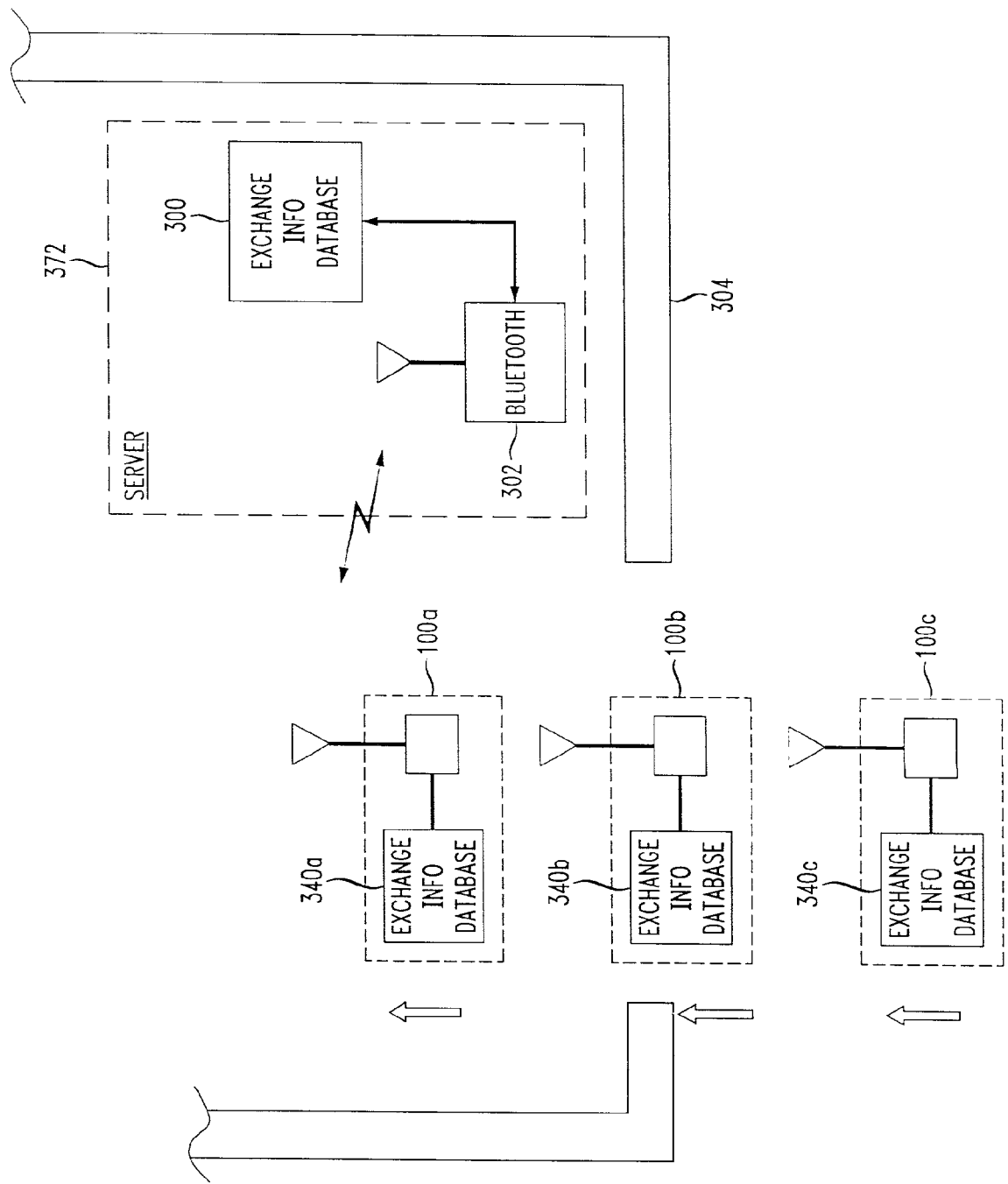
FIG. 5 shows another application of piconet wireless devices including GPS capability allowing exchange of certain data (e.g., business card data) when within a particularly defined region (e.g., conference room), in accordance with the principles of the present invention.
Figure 6:
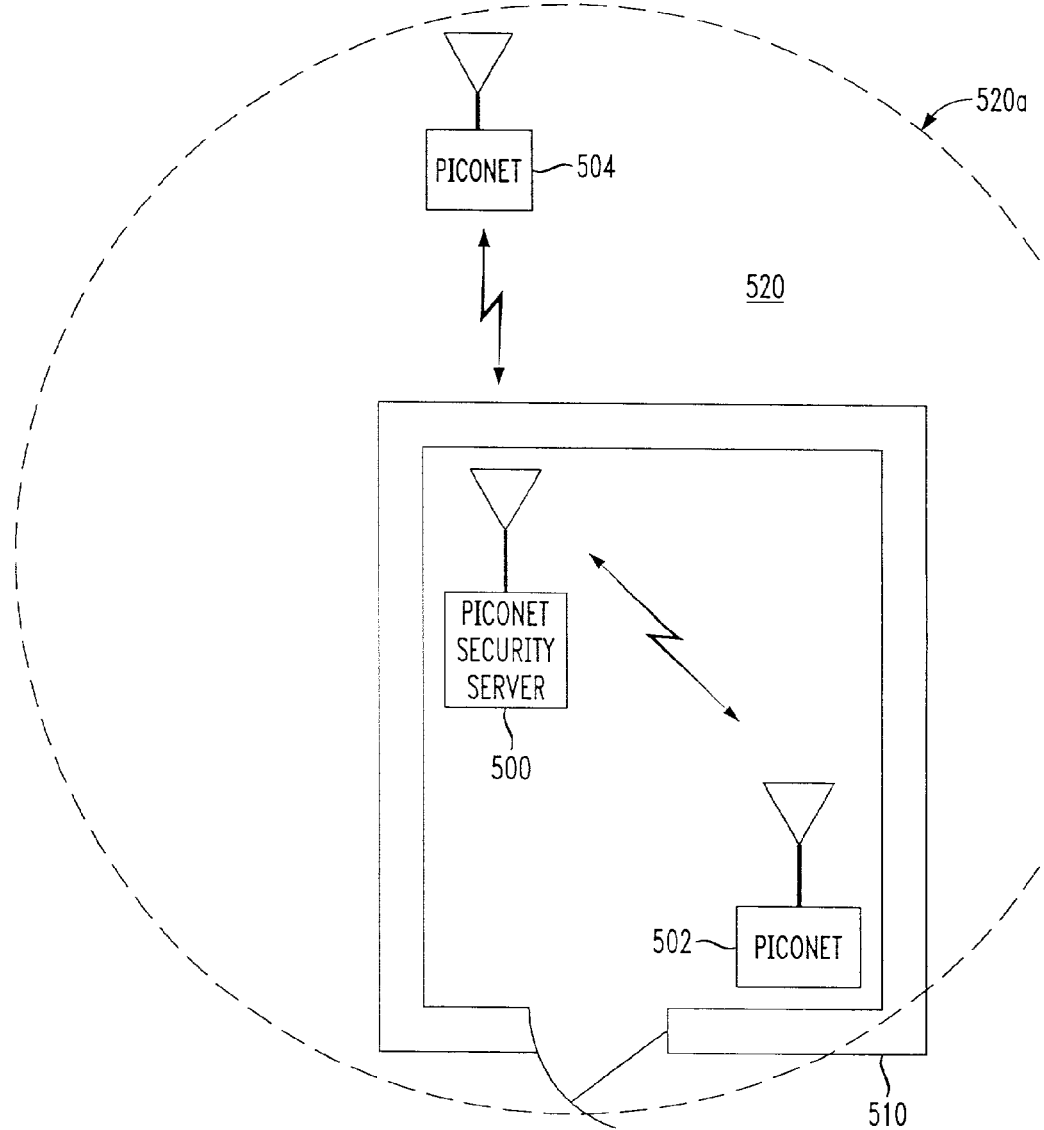
FIG. 6 depicts an exemplary secured building including a network of exemplary wireless devices, with connectivity access inadvertently provided to an unauthorized wireless device.

FIG. 5 shows another application of piconet wireless devices including GPS capability allowing exchange of certain data (e.g., business card data) when within a particularly defined region (e.g., conference room), in accordance with the principles of the present invention.

In particular, another use for GPS in a piconet wireless is to implement a piconet front end (e.g., a BLUETOOTH piconet front end) on a PDA device. Then, in a given scenario, a feature may allow a user's PDA to exchange business card information with others automatically, but, e.g., only within the walls of a convention. This requirement can be implemented as an enhancement to the Generic Object Exchange Profile found in BLUETOOTH specifications.

As shown in FIG. 5, a conference room 304 includes a server 372 including a wireless piconet (e.g., BLUETOOTH) front end, and a database 300 including information to be exchanged between conference participants (e.g., business card type information, service descriptions, exhibited product information, etc.)

Conference participants each have a wireless piconet network device 100 (e.g., PDA devices) including information to be exchanged with other conference participants. Each wireless piconet network device 100 includes a suitable exchange information database 340a–340c, which establishes a presence on a piconet network after entering the doorway of the conference room 304 at least long enough to synchronize exchange information databases 300, 340. In the given example, password authorization is not required: only earth coordinate information.

Thus, using a PDA with a BLUETOOTH piconet front end and an exchange information database 340 which is synchronized with another exchange information database 300, while a user is outside a convention buying a newspaper, exchange information remains private to the user's PDA. However, once the user enters the convention area, information such as business card information, etc., may be exchanged with a suitable server 372 allowing relevant exchange information databases 300, 340 to be appropriately synchronized. When a user leaves the convention, their PDA may again be synchronized with exchange information.

The earth coordinates of the convention area or other defined exchange area may be established by, e.g., walking the perimeter of the relevant area and storing periodic boundary coordinates. Alternatively, the appropriate coordinates may be published by the convention organizers beforehand for PDA users to input into their own PDA devices.

Shared exchange information can be based on GPS location coordinates of the relevant wireless piconet network devices and/or based on the earth coordinates of another wireless piconet network device requesting the exchange information.

Accordingly, the utilization of earth coordinates with a wireless piconet network device provides an additional level of security for wireless network connections, and provides greater control over privacy of information, while requiring minimal user input.

While the use of actual coordinates are shown and described in the given embodiments, the present invention relates equally to the use of an actual vector distance determined by a distance between earth coordinate locations of two separate wireless piconet network devices, within the scope of the present invention.

While the embodiments of the present invention are described and shown with reference to absolute earth coordinates determined by a GPS receiver, other coordinate or location determining technology may be implemented within the principles of the present invention. For instance, the present invention relates equally to the use of cell tower triangulation in determining a location of a particular wireless device.

While the invention has been described with reference to the exemplary embodiments thereof, those skilled in the art will be able to make various modifications to the described embodiments of the invention without departing from the true spirit and scope of the invention.

What is claimed is:

1. A wireless piconet server, comprising:
   a wireless piconet front end;
   boundary coordinates corresponding to a predetermined secured area for access to a wireless piconet network by a wireless piconet network device; and
   an earth coordinates authorization module to receive a set of coordinates associated with said wireless piconet network device and to determine authority of said wireless piconet network device to gain access to said wireless piconet network based on said set of coordinates.

2. The wireless piconet server according to claim 1, further comprising:
   a password authorization module to determine authority of said wireless piconet network device to gain access to said wireless network.

3. A wireless piconet device, comprising:
   a wireless piconet front end;
   a GPS receiver to receive a GPS signal, said GPS receiver being in communication with said wireless piconet front end;
   a password entry module allowing a user of said wireless piconet device to enter an authorizing password for transmission over said wireless piconet front end;
   a transmitter to transmit said GPS signal and said authorizing password over said wireless piconet front end; and
   an exchange information database to be synchronized with another exchange information database over said wireless piconet network.

4. The wireless piconet server according to claim 3, wherein:
   said exchange information database is synchronized only when said GPS receiver reports a location within a predetermined area.

5. A method of authorizing a wireless piconet network device to gain access to a wireless network, comprising:
   receiving a set of earth coordinates from said wireless piconet network device;
   comparing said received set of earth coordinates to predetermined boundaries of a secured area; and
   authorizing said wireless piconet network device to gain access to said wireless network based on said received set of earth coordinates.

6. The method of authorizing a wireless piconet network device to gain access to a wireless network according to claim 5, further comprising:
   determining if said received set of earth coordinates are within said predetermined boundaries of said secured area.

7. The method of authorizing a wireless piconet network device to gain access to a wireless network according to claim 5, wherein:
   said earth coordinates are received from said wireless piconet network device over said wireless network.

8. The method of authorizing a wireless piconet network device to gain access to a wireless network, comprising:
   receiving a set of earth coordinates from said wireless piconet network device;
   comparing said received set of earth coordinates to predetermined boundaries of a secured area;
   receiving a password from said wireless piconet network device;
   comparing said received password to a pre-authorized list of passwords; and authorizing said wireless piconet network device to gain access to said wireless network only if both said received set of earth coordinates are within predetermined boundaries of said secured area and said received password is present in said pre-authorized list of passwords.

9. Apparatus for authorizing a wireless piconet network device to gain access to a wireless network, comprising:

means for receiving a set of earth coordinates from said wireless piconet network device;

means for comparing said received set of earth coordinates to predetermined boundaries of a secured area; and means for authorizing said wireless piconet network device to gain access to said wireless network based on said received set of earth coordinates.

10. The apparatus for authorizing a wireless piconet network device to gain access to a wireless network according to claim 9, wherein:

said means for receiving receives said earth coordinates from said wireless piconet network device over said wireless network.

11. Apparatus for authorizing a wireless piconet network device to gain access to a wireless network, comprising:

means for receiving a set of earth coordinates from said wireless piconet network device;

means for comparing said received set of earth coordinates to predetermined boundaries of a secured area;

means for authorizing said wireless piconet network device to gain access to said wireless network based on said received set of earth coordinates;

means for receiving a password from said wireless piconet network device; and means for comparing said received password to a pre-authorized list of passwords;

wherein said means for authorizing authorizes said wireless piconet network device to gain access to said wireless network only if both said received set of earth coordinates are within said predetermined boundaries of said secured area and said received password is present in said pre-authorized list of passwords.

* * * * *